United States Patent
Steele et al.

(10) Patent No.: US 9,884,539 B2
(45) Date of Patent: Feb. 6, 2018

(54) DIESEL ENGINE POWERED TRANSPORTATION REFRIGERATION SYSTEM

(71) Applicant: Carrier Corporation, Farmington, CT (US)

(72) Inventors: John T. Steele, Marcellus, NY (US); Benjamin Edward Ferguson, Cazenovia, NY (US); Garrison S. Moseley, Liverpool, NY (US); Daniel M. Maybury, Baldwinsville, NY (US); Rasmus Sorensen, Middelfart (DK)

(73) Assignees: CARRIER CORPORATION, Farmington, CT (US); DINEX A/S, Middelfart (DK)

(*) Notice: Subject to any disclaimer, the term of this patent is extended or adjusted under 35 U.S.C. 154(b) by 0 days.

(21) Appl. No.: 14/911,504

(22) PCT Filed: Jun. 11, 2014

(86) PCT No.: PCT/US2014/041900
§ 371 (c)(1),
(2) Date: Feb. 11, 2016

(87) PCT Pub. No.: WO2015/023350
PCT Pub. Date: Feb. 19, 2015

(65) Prior Publication Data
US 2016/0185187 A1    Jun. 30, 2016

Related U.S. Application Data

(60) Provisional application No. 61/865,858, filed on Aug. 14, 2013.

(51) Int. Cl.
*B60H 1/32*    (2006.01)
*F02D 41/02*    (2006.01)
(Continued)

(52) U.S. Cl.
CPC ......... *B60H 1/3222* (2013.01); *B60H 1/3232* (2013.01); *B60P 3/20* (2013.01);
(Continued)

(58) Field of Classification Search
CPC ....... F02D 33/02; F02D 29/04; B60H 1/3222; B60H 1/3232; F01N 3/023; F01N 3/025
See application file for complete search history.

(56) References Cited

U.S. PATENT DOCUMENTS

2005/0109028 A1* 5/2005 Shirakawa ............ F01N 3/0814
60/602
2006/0117740 A1    6/2006 Okugawa et al.
(Continued)

FOREIGN PATENT DOCUMENTS

EP    1450026 A2    8/2004
EP    1553267 A1    7/2005
(Continued)

OTHER PUBLICATIONS

JP 05104941A, Machine Translation, Translated on Mar. 20, 2017.*
(Continued)

*Primary Examiner* — Patrick Maines
(74) *Attorney, Agent, or Firm* — Cantor Colburn LLP

(57) ABSTRACT

A transport refrigeration system (10) includes a refrigerant vapor compression transport unit (12) including a compressor (14). A drive unit is utilized to provide power to the compressor. The drive unit includes a diesel powered engine (32) and a diesel particulate filter in operable communication with the diesel powered engine to filter combustion particulates from an exhaust gas output from the diesel powered engine. An air control valve is in operable communication with the diesel powered engine to control a flow of air into an air inlet of the diesel powered engine, thereby
(Continued)

controlling an exhaust gas temperature of the diesel engine to aid in regeneration of the diesel particulate filter.

15 Claims, 3 Drawing Sheets

(51) Int. Cl.
| | |
|---|---|
| *F02D 41/14* | (2006.01) |
| *F01N 3/025* | (2006.01) |
| *F01N 3/035* | (2006.01) |
| *F02D 29/04* | (2006.01) |
| *F02D 41/00* | (2006.01) |
| *F01N 9/00* | (2006.01) |
| *B60P 3/20* | (2006.01) |
| *F25B 27/00* | (2006.01) |
| *F01N 3/023* | (2006.01) |
| *F02D 33/02* | (2006.01) |
| *F02D 29/06* | (2006.01) |
| *F02D 11/10* | (2006.01) |
| *F25B 40/00* | (2006.01) |

(52) U.S. Cl.
CPC ............. *F01N 3/023* (2013.01); *F01N 3/025* (2013.01); *F01N 3/0253* (2013.01); *F01N 3/035* (2013.01); *F01N 9/002* (2013.01); *F02D 29/04* (2013.01); *F02D 33/02* (2013.01); *F02D 41/0002* (2013.01); *F02D 41/029* (2013.01); *F02D 41/1446* (2013.01); *F25B 27/00* (2013.01); *F01N 2430/00* (2013.01); *F01N 2590/08* (2013.01); *F01N 2900/08* (2013.01); *F01N 2900/1404* (2013.01); *F02D 29/06* (2013.01); *F02D 2011/102* (2013.01); *F25B 40/00* (2013.01); *F25B 2327/001* (2013.01); *F25B 2339/047* (2013.01); *F25B 2400/13* (2013.01); *Y02T 10/42* (2013.01); *Y02T 10/47* (2013.01)

(56) References Cited

U.S. PATENT DOCUMENTS

| | | | |
|---|---|---|---|
| 2014/0026599 A1* | 1/2014 | Rusignuolo | F25B 49/025 62/56 |
| 2014/0223933 A1* | 8/2014 | Steele | F25B 25/005 62/98 |
| 2014/0250941 A1* | 9/2014 | Steele | F25B 27/00 62/323.1 |
| 2014/0331706 A1* | 11/2014 | Taras | F25B 27/00 62/243 |
| 2014/0345301 A1* | 11/2014 | Steele | B60P 3/20 62/61 |
| 2015/0168032 A1* | 6/2015 | Steele | B60P 3/20 62/61 |

FOREIGN PATENT DOCUMENTS

| | | | |
|---|---|---|---|
| EP | 1726806 A1 | | 11/2006 |
| EP | 1905992 A1 | | 4/2008 |
| GB | 2416717 A | | 2/2006 |
| JP | 05104941 A | * | 4/1993 |
| WO | 2013095895 A3 | | 10/2013 |

OTHER PUBLICATIONS

Notification of Transmittal of the International Search Report and the Written Opinion of the International Searching Authority, or the Declaration; Application No. PCT/US2014/041900; dated Nov. 5, 2014; 10 pages.

* cited by examiner

DIESEL ENGINE POWERED TRANSPORTATION REFRIGERATION SYSTEM

BACKGROUND

The subject matter disclosed herein relates to transportation refrigeration systems. More specifically, the subject matter disclosed herein relates to filtering of exhaust gas from transportation refrigeration systems.

Fruits, vegetables and other perishable items, including meat, poultry and fish, fresh or frozen, are commonly transported in the cargo box of a truck or trailer, or in an intermodal container. Accordingly, it is customary to provide a transportation refrigeration system in operative association with the cargo box for cooling the atmosphere within the cargo box. The transport refrigeration system includes a refrigerant vapor compression system, also referred to as a transport refrigeration unit, and an on-board power unit. The refrigerant vapor compression system typically includes a compressor, a condenser, an expansion device and an evaporator serially connected by refrigerant lines in a closed refrigerant circuit in accord with known refrigerant vapor compression cycles. The power unit includes an engine, typically diesel powered.

The diesel engine, however, produces harmful soot particles that are removed from the exhaust stream via a diesel particulate filter (DPF). The filter is periodically regenerated, removing the accumulated soot particles from the filter, either via passive or active means. Passive means using the diesel engine exhaust temperature with a catalyst added to the exhaust stream to raise the exhaust gas temperature to combust the soot particles. Active means using the passive system with the addition of injecting added fuel into the exhaust stream, where the added fuel is oxidized by the catalyst to raise the exhaust gas temperature to combust the soot particles.

Transportation refrigeration systems often operate at low speeds and low loads, which results in exhaust temperature below the catalyst activation temperature, the point at which the catalyst will oxidize hydro carbons. During such conditions, the DPF will not successfully passively or actively regenerate.

BRIEF SUMMARY

In one embodiment, a transport refrigeration system includes a refrigerant vapor compression transport unit including a compressor. A drive unit is utilized to provide power to the compressor. The drive unit includes a diesel powered engine and a diesel particulate filter in operable communication with the diesel powered engine to filter combustion particulates from an exhaust gas output from the diesel powered engine. An air control valve is operably connected to the diesel powered engine to control a flow of air into an air inlet of the diesel powered engine, thereby controlling an exhaust gas temperature of the diesel engine to aid in regeneration of the diesel particulate filter.

In another embodiment, a method of operating a transport refrigeration system includes powering a compressor of a refrigerant vapor compression transport refrigeration unit via a diesel engine operably connected thereto and flowing exhaust gas from operation of the diesel engine toward a diesel particulate filter to filter combustion particulates from the exhaust. An air control valve is operably connected to the diesel engine to control a flow of air into an air inlet of the diesel powered engine, thereby controlling an exhaust gas temperature of the diesel engine to aid in regeneration of the diesel particulate filter. The collected particulates are combusted at the diesel particulate filter via the exhaust gas.

These and other advantages and features will become more apparent from the following description taken in conjunction with the drawings.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

Figure 1:
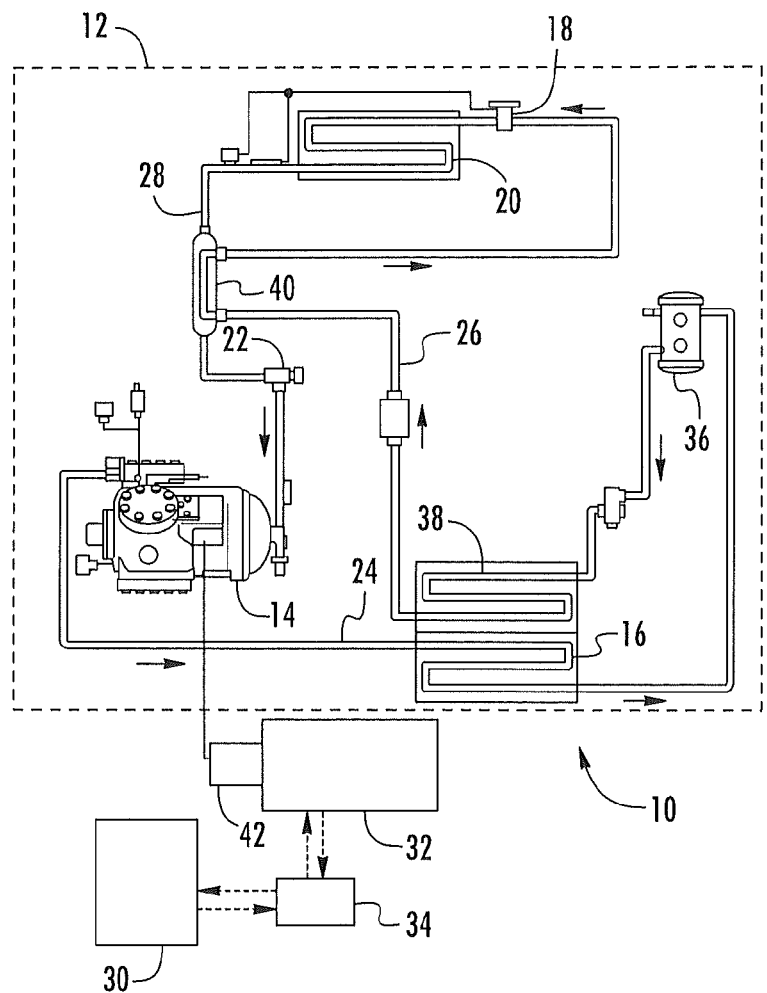
FIG. 1 is a schematic view of an embodiment of a transport refrigeration system.

The detailed description explains embodiments of the invention, together with advantages and features, by way of example with reference to the drawing.

DETAILED DESCRIPTION

Figure 2:
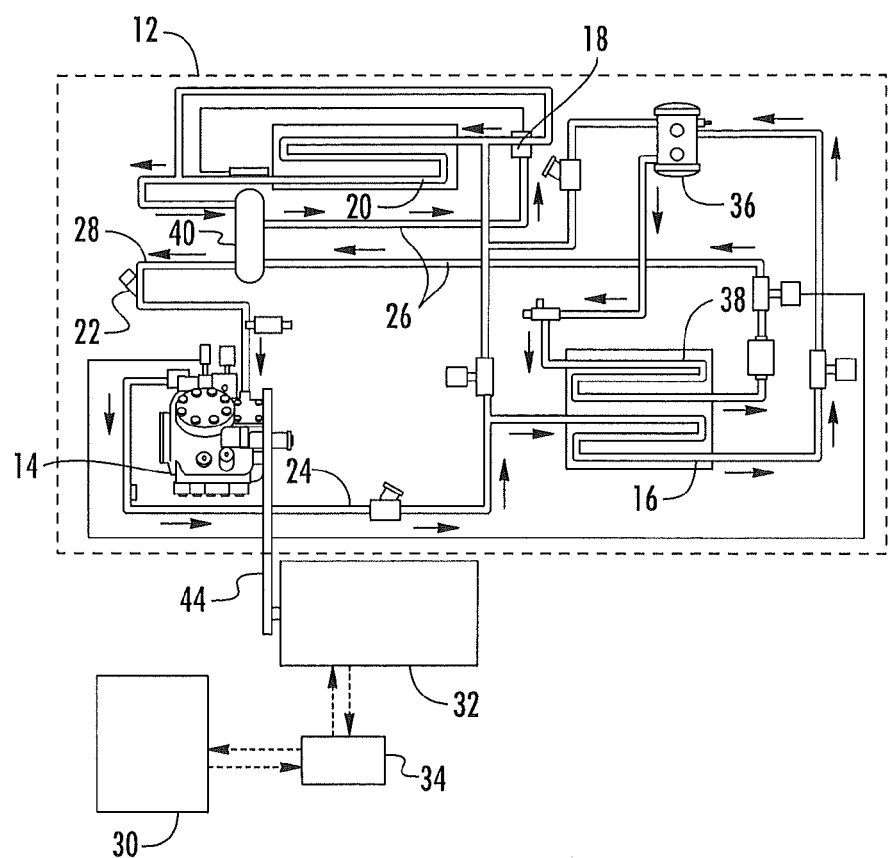
FIG. 2 is a schematic view of another embodiment of a transport refrigeration system.

Referring initially to FIGS. 1 and 2, there are depicted exemplary embodiments of transport refrigeration systems for controlling the temperature of the atmosphere within the cargo box of a truck, trailer, container, intermodal container or similar cargo transportation unit. The transportation refrigeration system 10 includes a transport refrigeration unit 12 including a compressor 14, a refrigerant condenser heat exchanger 16, an expansion device 18, a refrigerant evaporator heat exchanger 20 and a suction modulation valve 22 connected in a closed loop refrigeration circuit including refrigerant lines 24, 26 and 28 and arranged in a conventional refrigeration cycle. The transport refrigeration system 10 further includes an electronic system controller 30, a diesel engine 32 and an engine controller 34. The transport refrigeration system 10 is mounted as in conventional practice to an exterior wall of the truck, trailer or container with the compressor 14 and the condenser heat exchanger 16 with its associated condenser fan(s) (not shown) and diesel engine 32 disposed externally of the refrigerated cargo box.

As is conventional practice, when the transport refrigeration unit 12 is operating in a cooling mode, low temperature, low pressure refrigerant vapor is compressed by the compressor 14 to a high pressure, high temperature refrigerant vapor and passed from the discharge outlet of the compressor 14 into refrigerant line 24. The refrigerant circulates through the refrigerant circuit via refrigerant line 24 to and through the heat exchange tube coil or tube bank of the condenser heat exchanger 16, wherein the refrigerant vapor condenses to a liquid, thence through the receiver 36, which provides storage for excess liquid refrigerant, and thence through the subcooler coil 38 of the condenser. The subcooled liquid refrigerant then passes through refrigerant line 24 through a first refrigerant pass of the refrigerant-to-refrigerant heat exchanger 40, and thence traverses the expansion device 18 before passing through the evaporator heat exchanger 20. In traversing the expansion device 18, which may be an electronic expansion valve (EXV) as depicted in FIG. 1 or a mechanical thermostatic expansion valve (TXV) as depicted in FIG. 2, the liquid refrigerant is expanded to a lower temperature and lower pressure prior to passing to the evaporator heat exchanger 20.

In flowing through the heat exchange tube coil or tube bank of the evaporator heat exchanger 20, the refrigerant evaporates, and is typically superheated, as it passes in heat exchange relationship return air drawn from the cargo box passing through the airside pass of the evaporator heat exchanger 20. The refrigerant vapor thence passes through the refrigerant line 26, the refrigerant vapor traverses a second refrigerant pass of the refrigerant-to refrigerant heat exchanger 40 in heat exchange relationship with the liquid refrigerant passing through the first refrigerant pass thereof. Before entering the suction inlet of the compressor 14, the refrigerant vapor passes through the suction modulation valve 22 disposed in refrigerant line 26 downstream with respect to refrigerant flow of the refrigerant-to-refrigerant heat exchanger 40 and upstream with respect to refrigerant flow of the compressor 14. By selectively reducing the open flow area through the suction modulation valve 22, the controller 30 can selectively restrict the flow of refrigerant vapor supplied to the compressor 14, thereby reducing the capacity output of the transportation refrigeration unit 12 and in turn reducing the power demand imposed on the engine 32.

Air drawn from within the cargo box by the evaporator fan(s) (not shown) associated with the evaporator heat exchanger 20, is passed over the external heat transfer surface of the heat exchange tube coil or tube bank of the evaporator heat exchanger 20 and circulated back into the interior space of the cargo box. The air drawn from the cargo box is referred to as "return air" and the air circulated back into the cargo box is referred to as "supply air". It is to be understood that the term "air" as used herein includes mixtures of air and other gases, such as for example, but not limited to nitrogen or carbon dioxide, sometimes introduced into a refrigerated cargo box for transport of perishable product such as produce.

Although the particular type of evaporator heat exchanger 20 used is not limiting of the invention, the evaporator heat exchanger 20 may, for example, comprise one or more heat exchange tube coils, as depicted in the drawing, or one or more tube banks formed of a plurality of tubes extending between respective inlet and outlet manifolds. The tubes may be round tubes or flat tubes and may be finned or un-finned.

The compressor 14 may comprise a single-stage or multiple-stage compressor such as, for example, a reciprocating compressor as depicted in the exemplary embodiments shown in FIGS. 1 and 2. However, the compressor 14 may be a scroll compressor or other type of compressor as the particular type of compressor used is not germane to or limiting of the invention. In the exemplary embodiment of FIG. 1, the compressor 14 comprises a reciprocating compressor having a compressing mechanism, an internal electric compressor motor and an interconnecting drive shaft that are all sealed within a common housing of the compressor 14. The diesel engine 32 drives an electric generator 42 that generates electrical power for driving the compressor motor, which in turn drives the compression mechanism of the compressor 14. The drive shaft of the diesel engine 32 drives the generator shaft. In the embodiment of FIG. 2, the compressor 14 is a reciprocating compressor having a compressing mechanism with a shaft driven directly by the drive shaft of the diesel engine 32, either through a direct mechanical coupling or through a belt drive 38 as illustrated in FIG. 2.

Figure 3:
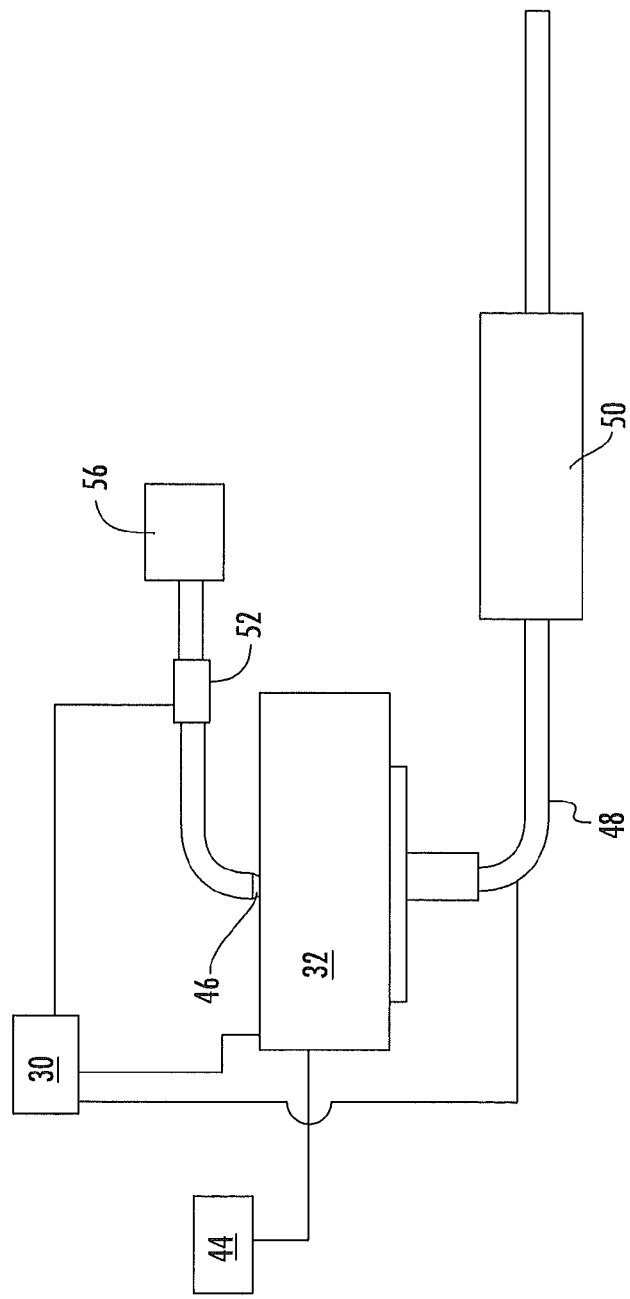
FIG. 3 is a schematic view of a portion of a transport refrigeration system.

Referring now to FIG. 3, the diesel engine 32 receives diesel fuel from a fuel supply 44 and air through an air inlet 46. After combustion in the diesel engine 32, the byproducts of combustion, exhaust gas including particulates such as soot and other materials, exits the diesel engine 32 via an exhaust pathway 48. A diesel particulate filter (DPF) 50 is provided along the exhaust pathway 48 to remove the particulates from the exhaust gas prior to the exhaust gas reaching the ambient atmosphere. The DPF 50 is periodically regenerated to remove accumulated organic particulates from the DPF 50. Regeneration is accomplished using exhaust gas temperature to burn the particulates thus removing the particulates from the DPF 50. To burn the particulates, it is necessary for the exhaust gas to be at a temperature of at least 290 degrees Celsius. In some embodiments, it is desired for the exhaust gas to be at a temperature of at least 600 degrees Celsius. It is to be appreciated that these temperatures are merely exemplary, and that the activation temperature of a DPF 50 depends on many factors, for example, a concentration of precious metals in the DPF 50. To ensure that the exhaust gas is at the necessary temperature, especially when the diesel engine 32 is operating at low speeds and/or low loads, an air throttle valve 52 is located in an air intake pathway 54 upstream of the air inlet 46 of the diesel engine 32. In some embodiments, the air throttle valve 52 is located between an engine air cleaner 56 and the air inlet 46, and may be, for example, an electronic or mechanically operated valve. The air throttle valve 52 is connected to the system controller 30, which may use information such as diesel engine 32 speed, system load and/or exhaust gas temperature to position the air throttling valve 52 therethrough and into the air inlet 46. In operation, when the air throttle valve 52 is moved toward a closed position, the exhaust gas temperature output from each cylinder of the diesel engine 32 and entering the DPF 50 increases. When DPF 50 regeneration is desired or required, the controller 30 determines the air throttling valve 52 position required for the exhaust gas to meet or exceed the selected regeneration temperature, and the air throttling valve 52 is adjusted accordingly. The air throttling valve 52 is adjusted such that the selected temperature is reached, but airflow into the air inlet 46 is not overly restricted resulting in engine stall.

The use of the air throttling valve 52 along with controller 30 to adjust the exhaust gas temperature for regeneration of the DPF 50 allows for active regeneration at low loads of the diesel engine 32 utilizing the exhaust gas, catalyst and added fuel.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A transport refrigeration system comprising:
a refrigerant vapor compression transport unit including a compressor: and a drive unit to provide power to the compressor, the drive unit including:

a diesel powered engine;

a diesel particulate filter in operable communication with the diesel powered engine to filter combustion particulates from an exhaust gas output from the diesel powered engine;

an air throttling valve in operable communication with the diesel powered engine to control a flow of air into an air inlet of the diesel powered engine, thereby controlling the exhaust gas temperature of the diesel engine to aid in regeneration of the diesel particulate filter; and a controller operably connected to the air throttling valve, the controller configured to select and command an air throttling valve position utilizing one or more of diesel powered engine speed, transportation refrigeration system load or exhaust gas temperature.

2. The transport refrigeration system of claim 1, further comprising an engine air cleaner disposed upstream of the diesel engine.

3. The transport refrigeration system of claim 2, wherein the air throttling valve is disposed between the engine air cleaner and the air inlet.

4. The transport refrigeration system of claim 1, wherein the controller selects the air throttling valve position to achieve a selected exhaust gas temperature.

5. The transport refrigeration system of claim 4, wherein the selected exhaust gas temperature is at least 300 degrees Celsius.

6. The transport refrigeration system of claim 1, wherein decreasing airflow into the diesel engine via the air throttling valve increases the exhaust gas temperature.

7. The transport refrigeration system of claim 1, wherein the diesel engine is operably connected to the compressor via an electrical connection.

8. The transport refrigeration system of claim 1, wherein the diesel engine is operably connected to the compressor via one or more drive belts.

9. The transport refrigeration system of claim 1, wherein the air throttling valve is one of an electrically or mechanically operated valve.

10. A method of operating a transport refrigeration system comprising:

powering a compressor of a refrigerant vapor compression transport refrigeration unit via a diesel engine operably connected thereto;

flowing exhaust gas from operation of the diesel engine toward a diesel particulate filter;

collecting particulates from the exhaust gas in the diesel particulate filter;

operating an air throttling valve operably connected to the diesel engine to reduce an airflow into an air inlet of the diesel engine, a position of the air throttling valve selected utilizing one or more of diesel powered engine speed, transportation refrigeration system load or exhaust gas temperature;

increasing an exhaust gas temperature to a selected temperature via the reduction in airflow into the air inlet; and combusting the collected particulates at the diesel particulate filter via the exhaust gas.

11. The method of claim 10, wherein a controller operably connected to the air control valve directs operation of the air throttling valve.

12. The method of claim 10, wherein the airflow flows into the air inlet after passing through the air throttling valve.

13. The method of claim 10, further comprising flowing the airflow through an engine air cleaner before flowing the airflow through the air throttling valve.

14. The method of claim 10, wherein the selected temperature is at least 300 degrees Celsius.

15. The method of claim 10, further comprising powering the compressor via one of an electrical connection or a belt or driveshaft connection to the diesel engine.

* * * * *